United States Patent
Balmakhtar et al.

(12) 
(10) Patent No.: US 12,511,503 B2
(45) Date of Patent: Dec. 30, 2025

(54) SELECTIVE BEAM MODULATION FOR RADIO FREQUENCY IDENTIFICATION DEVICE READERS

(71) Applicant: T-Mobile Innovations LLC, Overland Park, KS (US)

(72) Inventors: Marouane Balmakhtar, Fairfax, VA (US); Lyle Paczkowski, Mission Hills, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 133 days.

(21) Appl. No.: 18/391,614

(22) Filed: Dec. 20, 2023

(65) Prior Publication Data
US 2025/0209285 A1 Jun. 26, 2025

(51) Int. Cl.
  G06K 7/10 (2006.01)
  G06K 19/077 (2006.01)
  H01Q 1/22 (2006.01)

(52) U.S. Cl.
  CPC ... G06K 7/10356 (2013.01); G06K 19/07773 (2013.01); H01Q 1/2216 (2013.01)

(58) Field of Classification Search
  CPC ........ G06K 7/10356; G06K 19/07773; H01Q 1/2216
  See application file for complete search history.

(56) References Cited

U.S. PATENT DOCUMENTS

| | | | | |
|---|---|---|---|---|
| 7,894,830 | B2* | 2/2011 | Rofougaran | G01S 19/49 455/456.6 |
| 8,593,283 | B2* | 11/2013 | Smith | G06K 7/10326 235/375 |
| 2008/0012710 | A1 | 1/2008 | Sadr | |
| 2016/0042206 | A1* | 2/2016 | Pesavento | G06K 7/10158 235/385 |
| 2020/0266669 | A1 | 8/2020 | Paidimarri et al. | |

FOREIGN PATENT DOCUMENTS

EP  4641438 A1  10/2025

OTHER PUBLICATIONS

Foreign Communication From a Related Counterpart Application, Extended EP Search Report and EP Search Opinion dated Sep. 26, 2025 EP Application No. 24218578.3.

* cited by examiner

*Primary Examiner* — An T Nguyen

(57) ABSTRACT

A radio-frequency identification (RFID) system includes RFID tags arranged in a plurality of separate rows, a RFID reader, and a computer system including a processor, a non-transitory computer readable medium, and one or more applications stored in the non-transitory computer readable medium. The one or more applications, when executed by the processor, initiate by the RFID reader a row scan, and modulate, using a beamforming control module, a configuration of a radiation beam. In addition, the one or more applications, when executed by the processor, modulate by a power control module an emission power of the reader antenna during the performance of the row scan, and detect by the RFID reader one or more of the RFID tags positioned along a row.

20 Claims, 10 Drawing Sheets

SELECTIVE BEAM MODULATION FOR RADIO FREQUENCY IDENTIFICATION DEVICE READERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio-frequency identification (RFID) technology permits for wireless identification and tracking of objects, making it applicable to a wide range of fields and industries, from supply chain management to asset tracking and access control systems. RFID technology has witnessed substantial advancements and growing adoption in recent years due to its efficiency and versatility in object identification and data collection. The core components of a RFID system are the RFID reader and the passive RFID tags.

SUMMARY

An embodiment of a RFID system comprises a RFID reader comprising a reader control unit and a reader antenna, wherein the reader antenna comprises a plurality of separate antenna elements, and a computer system communicatively coupled to the control unit of the RFID reader. The computer system comprises a processor, a non-transitory computer readable medium, and one or more applications stored in the non-transitory computer readable medium. The one or more applications, when executed by the processor, initiate by the RFID reader a 360° perimeter scan whereby the reader antenna, using a beamforming control module of the reader control unit, produces a plurality of radiation beams extending from the reader antenna and circumferentially spaced about an axis of the reader antenna, and modulate by a frequency control module of the reader control unit an emission frequency of the reader antenna during the performance of the 360° perimeter scan such that emission frequency bands of the plurality of radiation beams vary from one another. In addition, the one or more applications, when executed by the processor, detect by the RFID reader one or more first RFID tags of a plurality of RFID tags in response to producing one or more radiation beams of the plurality of radiation beams at a first emission frequency band that corresponds to an emission frequency band of the one or more first RFID tags, and detect by the RFID reader one or more second RFID tags, different from the one or more first RFID tags, of the plurality of RFID tags in response to producing one or more radiation beams of the plurality of radiation beams at a second emission frequency band that is different from the first emission frequency band and which corresponds to an emission frequency band of the one or more second RFID tags.

Another embodiment of a RFID system comprises a plurality of separate RFID tags arranged in a plurality of separate rows, a RFID reader comprising a reader control unit and a reader antenna, wherein the reader antenna comprises a plurality of separate antenna elements, and a computer system communicatively coupled to the control unit of the RFID reader. The computer system comprises a processor, a non-transitory computer readable medium, and one or more applications stored in the non-transitory computer readable medium. The one or more applications, when executed by the processor, initiate by the RFID reader a row scan whereby the reader antenna produces a radiation beam extending from the reader antenna and defined by an outer cutoff, and modulate, using a beamforming control module of the reader control unit, a configuration of the radiation beam whereby the cutoff of the radiation beam travels towards one or more RFID tags positioned along a first row of the plurality of rows of RFID tags. In addition, the one or more applications, when executed by the processor, modulate by a power control module of the reader control unit an emission power of the reader antenna during the performance of the row scan such that an emission power level of the radiation beam varies in magnitude, and detect by the RFID reader one or more of the RFID tags positioned along the first row as the cutoff of the radiation beam travels towards the one or more RFID tags positioned along the first row and as the configuration of the radiation beam is modulated by the power control module.

Another embodiment of a RFID system comprises a RFID reader comprising a reader control unit and a reader antenna, wherein the reader antenna comprises a plurality of separate antenna elements, and a computer system communicatively coupled to the control unit of the RFID reader. The computer system comprises a processor, a non-transitory computer readable medium, and one or more applications stored in the non-transitory computer readable medium. The one or more applications, when executed by the processor, initiate by the RFID reader a 360° perimeter scan whereby the reader antenna, using a beamforming control module of the reader control unit, produces a plurality of radiation beams extending from the reader antenna and circumferentially spaced about an axis of the reader antenna. In addition, the one or more applications, when executed by the processor, modulate by a power control module of the reader control unit an emission power of the reader antenna during the performance of the 360° perimeter scan such that emission power levels of the plurality of radiation beams vary in magnitude, and detect by the RFID reader one or more RFID tags of a plurality of separate RFID tags in response to the performance of the perimeter scan.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
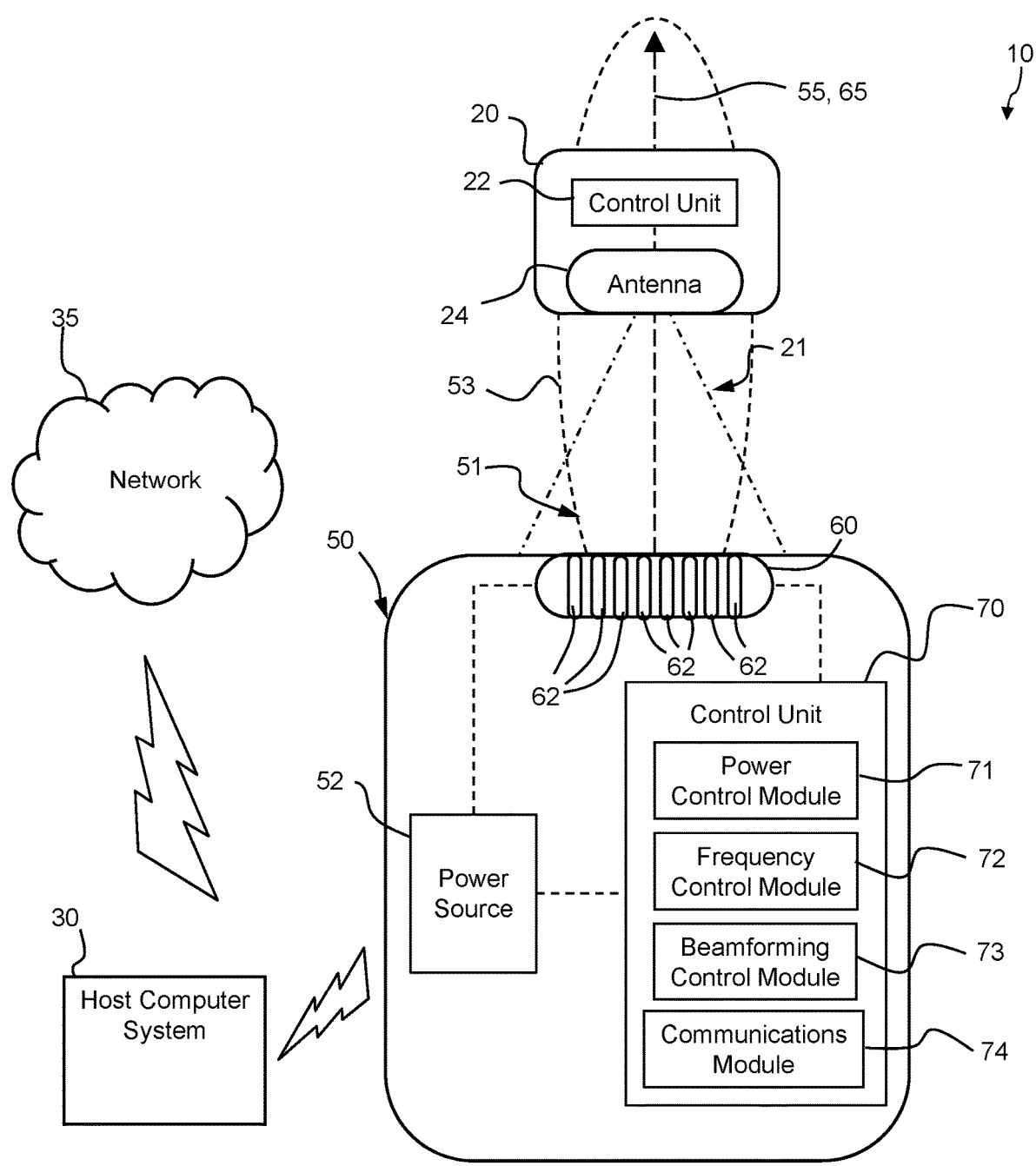
FIG. 1 is an illustration of a RFID system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "computer system" refers to both individual computer systems and networked computer systems which may collectively define a communication system. As described above, resources of a communication system may be accessed by different users for different purposes utilizing a network linking together the various individual computer systems defining the communication system.

As described above, RFID technology is applicable to a wide range of fields and industries for identifying and tracking different kinds of objects using RFID readers and corresponding RFID tags "readable" by an RFID reader. RFID readers, also known as interrogators or scanners, serve as the primary interface between the physical world and the digital realm in RFID systems. These devices transmit radio-frequency signals to activate passive RFID tags and retrieve information from them. RFID readers consist of an antenna for signal transmission and reception and an integrated circuit for processing data. Typically, these readers are connected to a computer or network infrastructure for data analysis and storage.

Passive RFID tags are the counterparts to RFID readers, and they are affixed to or embedded in objects that need to be identified, tracked, or monitored. These tags are inherently passive, meaning they do not have an internal power source but rely on the energy emitted by the RFID reader for operation. Each passive RFID tag comprises an antenna and an integrated circuit (IC) containing a unique identification code and, in some cases, additional data storage. When the RFID reader emits radio-frequency signals, these tags absorb the energy, activate, and respond by transmitting their stored information to the reader.

As described above, RFID technology is applicable to a wide variety of industries for identifying and tracking different objects. As an example, RFID technology has revolutionized supply chain management by providing real-time visibility and tracking capabilities. Retailers, manufacturers, and logistics companies use RFID to monitor the movement of products, reduce inventory shrinkage, optimize warehousing operations, and enhance the accuracy of order fulfillment. In addition, in industries such as healthcare, construction, and IT, RFID tags are employed for asset tracking. Valuable assets, equipment, and tools are tagged to enable efficient inventory control, minimize loss, and ensure that items are readily available when needed. RFID is commonly used in access control and security systems. RFID badges or cards with embedded passive tags grant or restrict access to secure areas. This technology provides an efficient and secure way to manage employee access and visitor control.

As another example, in the retail industry, RFID technology enhances inventory control, reduces out-of-stock situations, and improves the shopping experience. Particularly, retail inventory management is a critical aspect of the retail industry, where timely and accurate tracking of merchandise is essential for efficient operations, loss prevention, and customer satisfaction. Conventional barcode systems have been employed for inventory tracking, but they often suffer from limitations in terms of read range, line-of-sight scanning, and the manual labor required for scanning individual items. RFID technology has emerged as a promising solution to overcome these limitations.

RFID technology allows for the wireless identification of objects through the use of passive RFID tags and RFID readers. Passive RFID tags are cost-effective and durable, making them well-suited for tracking merchandise in a retail store setting. In a retail setting, RFID readers may be positioned at various locations throughout the store to effectively cover the entire inventory area. However, challenges arise when tracking merchandise in crowded or complex store layouts. Traditional RFID reader antennas often struggle to provide precise location information for individual items.

In addition, conventional RFID readers are typically unable to communicate selectively with only a desired subset of RFID tags within a given inventory area. This limitation of the functionality of conventional RFID readers manifests in several distinct issues in the context of retail stores. For example, it is sometimes difficult for conventional RFID readers to read RFID information from too great a number of corresponding RFID tags. For example, if the RFID reader broadcasts power in a large inventory area (e.g., a storage room or facility), an overwhelmingly large number of corresponding RFID tags (e.g., 10,000+ RFID tags) may all respond in relatively the same period of time (e.g., within 50 milliseconds (mS) of the initiation of the broadcast), making it incredibly difficult for the RFID reader to successfully read each of the responding RFID tags due to the massive volume of response signals generated in response to the transmission of the read signal from the RFID reader. Indeed, the overwhelming volume of concurrently produced response signals may result in the failure by the RFID reader to read at least some of the RFID tags. Further, conventional RFID readers do not elicit location information pertaining to the responding RFID tags responding to the broadcast of the corresponding RFID reader, making it difficult in at least some instances to locate in physical space the inventory associated with the responding RFID tags.

Accordingly, embodiments of RFID systems are described herein which address some of these limitations of conventional RFID technology. Particularly, embodiments of RFID systems are described herein including a RFID reader and a host computer system communicatively coupled to the RFID reader and containing instructions for implementing one or more different predefined scanning routines in which a read signal defined by a radiation beam is produced and modulated by the RFID reader to detect and read one or more RFID tags. As part of executing a given scanning routine, the host computer system may operate one or more control modules of a control unit of the RFID reader. Particularly, in some embodiments, the RFID reader may be equipped with a power control module for modulating an emission power of an antenna of the RFID reader. In addition, in some embodiments, the RFID reader may include a frequency control module for modulating an emission frequency band of the radiation beam. Further, in certain embodiments, the RFID reader may include a beamforming control module for forming and modulating the configuration of the radiation beam such that the beam is defined by an outer cutoff.

By operating the different control modules of the RFID reader in accordance with instructions stored on the host computer system, the host computer system may execute the one or more scanning routines. For example, the host computer system may execute a 360° perimeter scan whereby the RFID reader is instructed to programmatically scan or sweep the maximum emission area of the RFID reader so as to detect and read any RFID tags located within the maximum emission area. In addition, the host computer system may determine or infer the locations in physical space of any detected RFID tags relative to the location of the RFID reader by monitoring the configuration (e.g., direction, size, shape) of the radiation beam over time and correlating the given configuration of the radiation beam at the time of a detection of a given RFID tag understanding that detection is triggered by the radiation beam entering into contact with an antenna of the RFID tag.

In another example, the host computer system may execute a row scan in which one or more rows of a plurality of separate rows are scanned for RFID tags positioned therealong. This process may be performed programmatically such that the host computer system may determine the locations in physical space of any detected RFID tags relative to the location of the RFID reader. This scan may be targeted to certain locations along one or more of the rows (e.g., targeting one or more specific types or classes of merchandise known to reside in the targeted locations). Alternatively, each of the rows located within the maximum emission area of the RFID reader may be programmatically scanned.

In addition, embodiments of RFID systems may target specific subsets or classes of RFID tags (e.g., RFID tags linked to specific types or classes of inventory or merchandise of interest) by tailoring (e.g., via the frequency control module of the RFID reader) the emission frequency band of the radiation beam to match or overlap with an emission frequency band specific to the targeted class of RFID tags. In this manner, the RFID reader may elicit a response from only a subset of RFID tags within range of a tailored read signal produced by the RFID reader. Tailoring the read signal to produce a response from only a specific subset of RFID tags within range of the RFID reader may prevent the RFID reader from being overwhelmed by a large volume of concurrently generated response signals produced by a correspondingly large volume of RFID tags within range of the RFID reader. Instead, the large volume of RFID tags may be broken down into different subsets or cohorts of a more manageable size and which may be read sequentially.

As an example, host computer system may instruct the RFID reader to scan using a first emission frequency band corresponding to the emission frequency band of a first subset or class of RFID tags such that only those specific RFID tags (and not the RFID tags of other classes) will respond and be detectable by the radiation beam emitted from the RFID reader. In addition, after performing a first scan at the first emission frequency band, a second scan may be performed at a second emission frequency band (different from the first emission frequency band) in order to detect specifically those RFID tags corresponding to the second emission frequency band (e.g., RFID tags having antennas configured to receive signals specifically at the second emission frequency band). In this manner, along with determining a location in physical space of a given detected RFID tag, the host computer system may also ascertain the type or class of the RFID tag (e.g., the type or class of object to which the detected RFID tag is coupled or attached) detected by the RFID reader.

The RFID reader may adjust the focus of a read signal produced therefrom in multiple dimensions. For example, the RFID reader may adjust the angular focus of the read signal (e.g., via beam forming techniques), and the distance focus (e.g., through modulating an emission power level of the read signal) of the read signal. In addition to adjusting the focus of the read signal, the RFID reader may filter the read signal (e.g., adjusting an emission frequency of the read signal) to target specific RFID tags or subsets/cohorts of RFID tags. These three concepts (angular focus modulation, distance focus modulation, and filtering) may be used alone, in combination, and/or in a sequence to perform different tasks as will be discussed further herein. As but one example, filtering may be used in combination with angular focusing and/or distance focusing to estimate the positions in physical space of a selected cohort of RFID tags. For instance, filtering may be utilized to sequentially scan a plurality of different cohorts of RFID tags to estimate the positions of each RFID tag within range of the RFID reader without overwhelming the RFID reader with too large a volume of concurrently generated response signals from the RFID tags.

In some embodiments, the RFID reader is configured to automatically detect the presence of one or more persons within the path of the read signal and to reduce an emission power level of the read signal (e.g., to a predefined safe level that does not pose a health hazard to humans) in response to detecting the presence of the one or more persons. In this manner, the safety of the RFID system may be enhanced by ensuring that people within the vicinity of the RFID system are not contacted or otherwise exposed to excessive or harmful levels of RF radiation.

Referring now to FIG. 1, an RFID system 10 is shown according to some embodiments. RFID system 10 generally includes one or more first RFID devices in the form of one or more RFID tags 20, a host computer system 30, and one or more second RFID devices in the form of one or more RFID readers 50. The RFID reader 50 is generally configured to produce a wireless signal (e.g., a radio frequency (RF) signal) in the form of a read signal 51 which is detectable by the RFID tag 20. RFID tag 20 is configured to receive the read signal 51, and in response, produce a wireless signal (e.g., a RF signal) in the form of a response signal 21 detectable by the RFID reader 50. The response signal 21 may be encoded with information stored on the RFID tag 20 such as information identifying or otherwise characterizing the given RFID tag 20. The information encoded in the response signal 21 may be received by the RFID reader 50 and stored thereon.

At certain points in time, RFID reader 50 may communicate (wired or wirelessly) with the host computer system 30. For instance, the RFID reader 50 may convey information obtained from the RFID tag 20 to the host computer system 30 (e.g., for long-term storage, processing, or analysis). In addition, host computer system 30 may communicate via a wireless or wired link (e.g., communicate information obtained from RFID tag 20) at times with a network 35 which may comprise a wireless network. In some embodiments, network 35 comprises a cellular network such as a 5G network. In this manner, network 35 may connect RFID system 10 to computer systems located remote from RFID devices 20 and 50. In some embodiments, RFID system 10 includes components positioned both proximal RFID devices 20 and 50 (e.g., host computer system 30) and components located remote from RFID devices 20 and 50 (e.g., a network server connected to the host computer system 30).

The RFID tag 20 of RFID system 10 generally includes an onboard control unit 22 and an onboard antenna 24 communicatively coupled to the control unit 22. RFID tag 20 may have various sizes, shapes, or form factors, and may be integrated with a variety of different devices or products. Control Unit 22 may comprise a computer system including one or more processors and one or more storage devices (e.g., volatile and/or non-volatile memory) containing instructions executable by the one or more processors. Particularly, control unit 22 is generally configured to control the operation of antenna 24 of RFID tag 20. In addition, control unit 22 may store data obtainable by the RFID reader 50, such as information identifying or characterizing the RFID tag 20.

The antenna 24 of RFID tag 20 is generally configured to receive the read signal 51 produced by RFID reader 50, and in response, produce the response signal 21 to be received in-turn by the RFID reader 50. In some embodiments, antenna 24 comprises a wire antenna including loops or coils integrated into the RFID tag 20. In some embodiments, antenna 24 comprises a microstrip antenna suitable, e.g., for integration into labels or thin RFID tags. In certain embodiments, antenna 24 comprises a meander line antenna formed in a folded pattern. In certain embodiments, antenna 24 comprises a printed antenna such as an antenna printed onto a flexible substrate for integration into various products or devices. The aforementioned embodiments are meant to be only exemplary, and the configuration of antenna 24 may vary in other embodiments from the examples listed above.

In this exemplary embodiment, RFID tag 20 comprises a passive RFID tag and thus does not include a dedicated power source for powering the control unit 22 and antenna 24. Instead, RFID tag 20 is configured to utilize the energy contained in the read signal 51 to power the operation of RFID tag 20 (e.g., power the operation of control unit 22) in response to antenna 24 receiving the read signal 51. In this arrangement, RFID reader 50 selectably powers the operation of RFID 20 via the production of read signal 51. While RFID tag 20 comprises a passive RFID tag in this embodiment, in other embodiments, RFID tag 20 may instead comprise a powered RFID tag having its own dedicated source of power.

The RFID reader 50 of RFID system 10 is generally configured to read one or more RFID tags 20 to obtain information from the one or more RFID tags 20 which may, at times, be shared with host computer system 30. In this exemplary embodiment, RFID reader 50 generally includes a power source 52, an antenna 60, and a control unit 70 communicatively coupled to the antenna 60. The power source 52 powers the components of RFID reader 50 including, for example, antenna 60 and control unit 70. Power source 52 may comprise a battery pack, an electrical connection with an external power source such as an electrical grid, or other types of power sources.

The antenna 60 of RFID reader 50 defines a central or longitudinal antenna axis 65 and is generally configured to produce one or more read signals 51 as controlled by the control unit 70 of RFID reader 50 to communicate wirelessly (e.g., using RF signals) with one or more of the RFID tags 20. In some embodiments, antenna 60 comprises a multi-element antenna that comprises a plurality of separate and distinct antenna elements 60 arranged in a predefined spatial configuration or pattern (e.g., a linear array, a planar or two-dimensional array, or a three-dimensional array such as an X-array antenna) along the antenna 60. In some embodiments, antenna elements 62 may comprise, for example, a plurality of separate dipole antennas, path antennas, or microstrip antennas. As will be discussed further herein, antenna 60 may be controlled by control unit 70 of RFID reader 50 to implement one or more beamforming techniques for controlling the configuration of read signal 51.

While in this exemplary embodiment, antenna 60 comprises a multi-element antenna having a plurality of separate antenna elements 62, in other embodiments, antenna 60 may comprise single-element antenna that does not include a plurality of separate antenna elements arranged in a predefined pattern. The configuration of the predefined pattern and the number of antenna elements 62 of antenna 60 may vary depending on the given application. For example, in other embodiments, antenna 60 may comprise a single circular polarized antenna, a single linear polarized antenna, a single patch antenna, a single yagi antenna, and a single dipole antenna.

Control unit 70 of RFID reader 50 controls the operation of components of reader 50 including, for example, antenna 60. Control unit 70 may comprise a computer system including one or more processors and one or more storage devices (e.g., volatile and/or non-volatile memory) containing instructions (e.g., instructions for controlling the operation of antenna 60) executable by the one or more processors. In this exemplary embodiment, control unit 70 generally includes a power control module 71, a frequency control module 72, a beamforming control module 73, and a communications module 74. As will be discussed further herein, modules 71-74 of control unit 70 may be used to form the read signal 51 emitted by RFID reader 50 into a coherent radiation beam 53 extending along a central beam axis 55 (shown as coincident with antenna axis 65 in FIG. 1) and defined by an outer periphery defined by a sharp beam cutoff (represented by the dotted line in FIG. 1 defining radiation beam 53) extending around the beam axis 55. Antennas (e.g., the antenna 24 of RFID tag 20) positioned within the cutoff of radiation beam 53 may receive the read signal 51 (including power and/or data conveyed by read signal 51) while antennas positioned outside of the cutoff of radiation beam 53 do not receive the read signal 51. In this manner, the cutoff of radiation beam 53 defines the periphery or outer edge of radiation beam 53. In some embodiments, radiation beam 53 may be generally conical or lobe-shaped. In some embodiments, radiation beam 53 comprises a central lobe of a plurality of lobes (e.g., side lobes extending at an angle to the central lobe) defining read signal 51 where only the central lobe is shown in FIG. 1.

In some embodiments, the RFID reader 50 is configured to automatically detect the presence of one or more persons within the path of the read signal 51 and to reduce an emission power level of the read signal 51 in response to detecting the presence of the one or more persons. In this manner, the safety of the RFID system 10 may be enhanced by ensuring that people within the vicinity of the RFID system 10 are not contacted or otherwise exposed to excessive or harmful levels of RF radiation. For example, the RFID reader 50 may detect the presence of one or more persons by detecting a difference in the response signal 21 received by a given RFID tag 20 in the path of the read signal 51 as compared to previous response signals 21 received by the RFID reader 50 in the past. This perturbance in the response signal 21 may indicate to the RFID reader 50 the presence of an intervening body (e.g., one or more persons) in the path of the received response signal 21.

In an embodiment, specialized powered RFID tags 20 (e.g., RFID beacons 20) may continuously transmit signals 21 detectable by the RFID reader 50. For example, these RFID beacons 20 may be positioned at predefined locations (e.g., attached to shelving or other structures) and which may transmit their signals 21 at a specific frequency. The signals 21 continuously transmitted by RFID beacons 20 may act as a calibrated baseline for the RFID reader 50 such that perturbances in the signals 21 generated by RFID beacons 20 may be quickly and accurately determined by the RFID reader 50 as due to the presence of an intervening body (e.g., one or more persons) in the path of the continuously emitted signal 21, indicating the presence of one or more people in the location of the given RFID beacon 20. The RFID reader 50 may alter its read signal 51 when broadcasting in the direction of the detected one or more persons so as to ensure the safety of persons located within the vicinity of the RFID reader 50.

Figure 2:
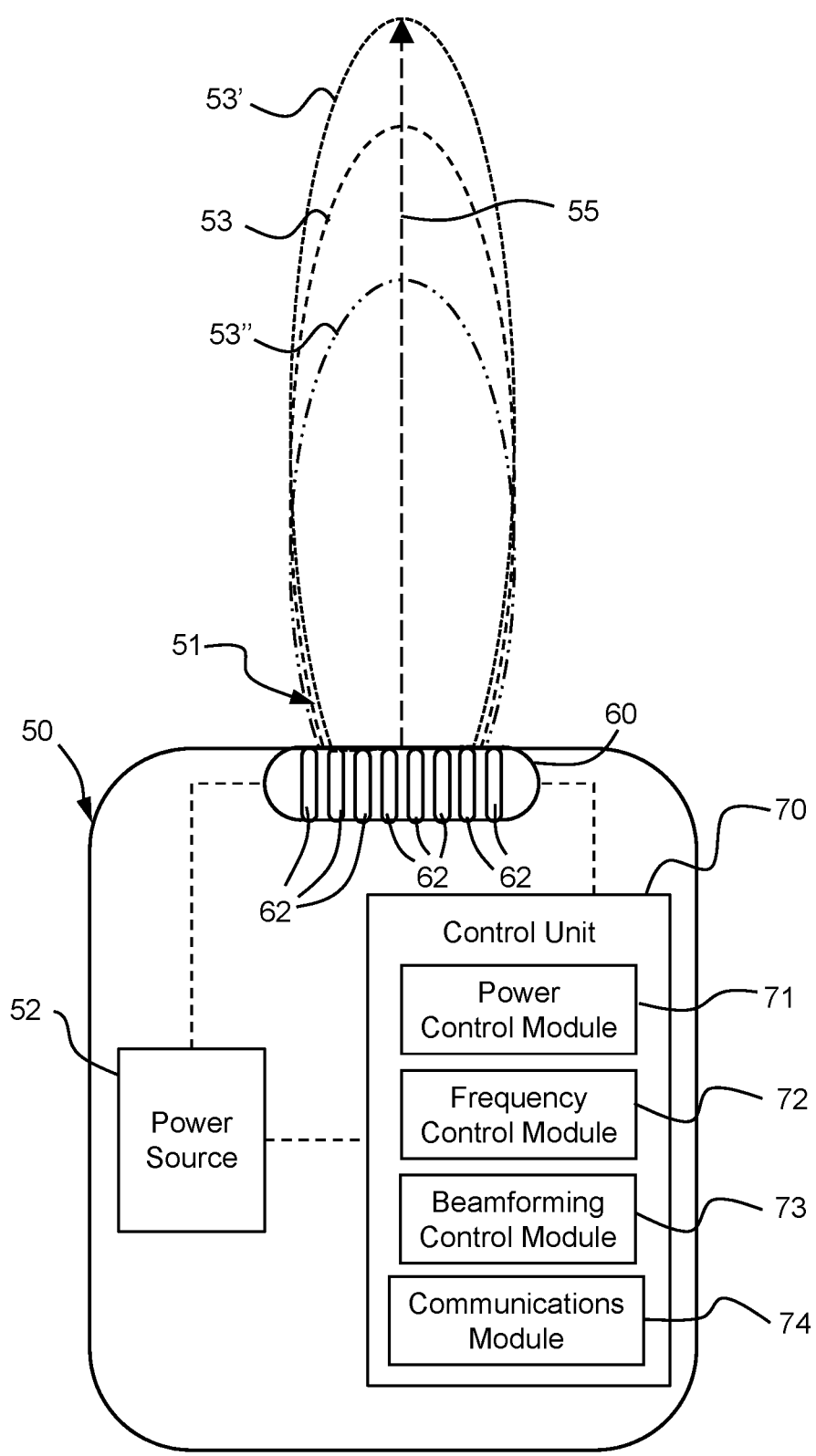
FIGS. 2-4 are illustrations of a RFID reader according to an embodiment of the disclosure.

The power control module 71 of control unit 70 is generally configured to programmatically control an overall emission power level of the read signal 51 defined by radiation beam 53 and produced by the antenna 60. In other words, power control module 71 may selectably adjust (e.g., increase or decrease) the total emission power level of read signal 51. For example, and referring now to FIG. 2, by increasing the emission power level of read signal 51, the longitudinal length of radiation beam 53 along beam axis 55 may be increased to form an elongated radiation beam 53'. Conversely, by decreasing the emission power level of read signal 51, the longitudinal length of radiation beam 53 along beam axis 55 may be reduced to produce a shortened radiation beam 53". In addition, the operation of power control module 71 may be controlled by instructions stored in control unit 70 and/or in the host computer system 30. For example, the operation of power control module 71 may be controlled in accordance with one or more predefined (e.g., stored in a storage device of a computer system and executable as instructions by a processor of the computer system) scanning routines as will be discussed further herein.

Referring again to FIG. 1, the frequency control module 72 of control unit 70 assists in controlling the operation of antenna 60. Particularly, frequency control module 72 programmatically controls an emission spectrum or frequency band of the read signal 51 defined by radiation beam 53. Particularly, RFID tags 20 may be tuned or configured to respond (e.g., produce response signal 21 in response to receiving the given read signal 51) to only read signals 51 emitted within a given emission frequency band.

For example, a first RFID tag 20 may be configured to respond to only read signals 51 produced within a first emission frequency band (e.g., between 860 megahertz (MHz) and 870 MHz) while a second RFID tag 20 may be configured to respond to only read signals 51 produced within a second emission frequency band which does not overlap with the first emission frequency band (e.g., between 880 MHz and 890 MHz). In this manner, when both the first and second RFID tags 20 are illuminated by the same read signal 51 produced by RFID reader 50, the first and second RFID tags 20 will only respond if the emission frequency band of read signal 51 falls within the specific emission frequency bands associated with the first and second RFID tags 20. For example, if the read signal 51 falls within the first emission frequency band, then only the first RFID tag 20 will respond. Conversely, if the read signal 51 falls within the second emission frequency band (but not the first band), then only the second RFID tag 20 will respond.

This technique may be implemented across a broad spectrum of distinct emission frequency bands such that a set containing a great number of RFID tags 20 (e.g., 10,000+ RFID tags 20) within transmission range of RFID reader 50 may be broken down into a plurality of different subsets each associated with a specific emission frequency band and containing a more manageable number of RFID tags 20 (e.g., each subset may contain 100 different RFID tags 20). In this manner, rather than communicating with the entire set of RFID tags 20 via producing a given read signal 51, specific subsets of RFID tags 20 may be targeted by the RFID reader 50 by tuning the emission frequency band of read signal 51 to overlap with the emission frequency band associated with a desired subset of RFID tags 20. In doing so, the RFID system 10 may avoid situations in which the RFID reader 50 is overwhelmed by a large number of response signals 21 received in response to the production of a given read signal 51. Instead, the different subsets of RFID tags 20 may be intentionally targeted for scanning by RFID reader 50 through programmatically adjusting the emission frequency band of the read signal 51 produced by the antenna 60 of RFID reader 50.

The beamforming control module 73 of control unit 70 also assists in controlling the operation of antenna 60. Particularly, beamforming control module 73 programmatically controls or tunes the configuration of the radiation beam 53 defining the read signal 51 produced by antenna 60. In this exemplary embodiment, beamforming control module 73 is configured to specifically and independently control the operation of the plurality of antenna elements 62 of antenna 60 so as to programmatically tune the configuration of radiation beam 53 in accordance with one or more predefined scanning routines as will be discussed further herein. Specifically, in this exemplary embodiment, beamforming control module 73 is configured to independently control the gain or amplitude and the phase of each of the antenna elements 62 of antenna 60 to thereby selectively tune the radiation beam 53 produced by antenna 60.

Figure 3:
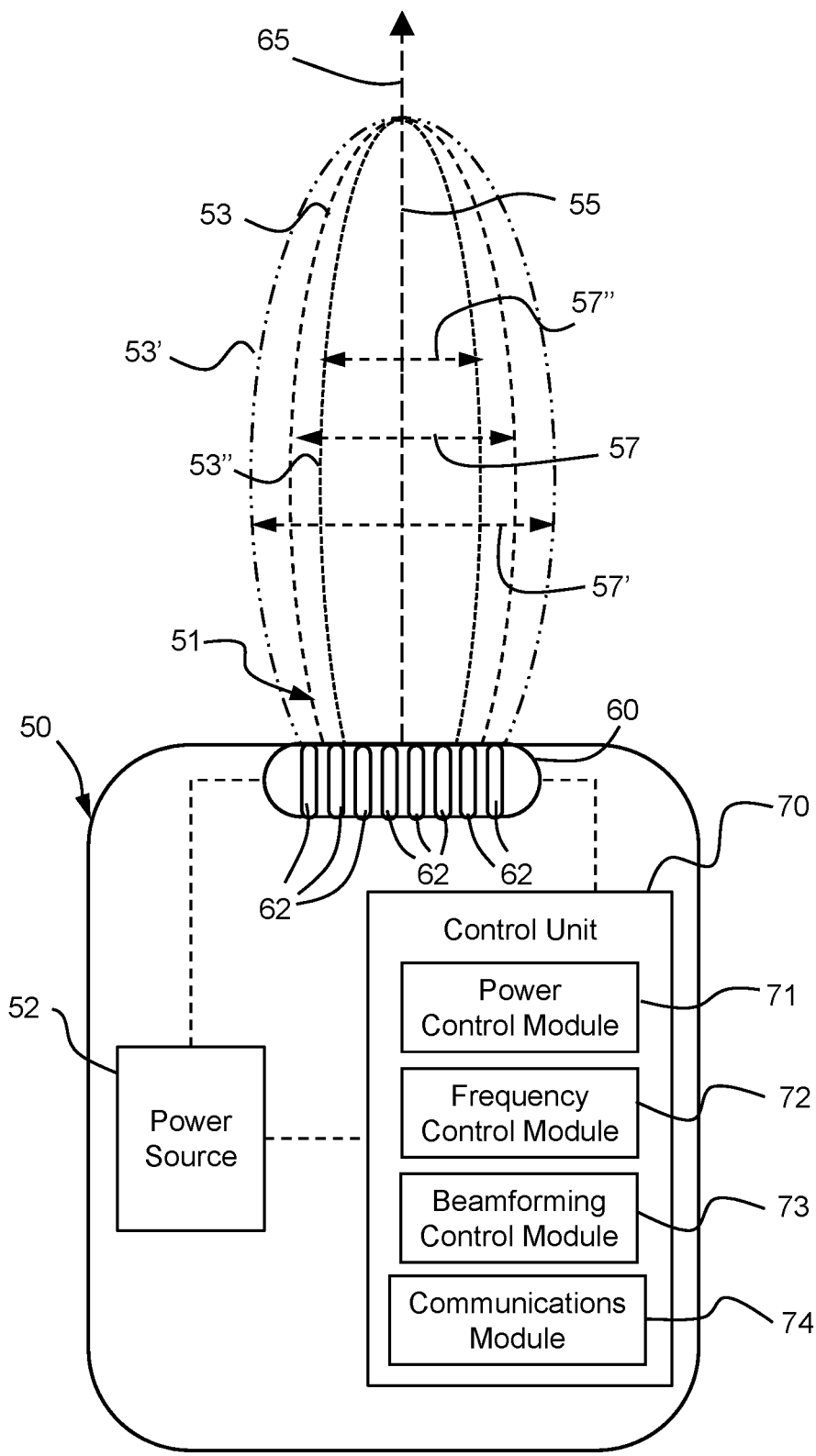

As an example, and referring to FIG. 3, antenna elements 62 of antenna 60 may be tuned by beamforming control module 73 to selectively adjust a width or diameter 57 (extending orthogonal to the beam axis 55) of the radiation beam 53 as defined by the cutoff of the radiation beam 53. For example, the gain and/or phase of at least some of the antenna elements 62 of antenna 60 may be altered to increase the diameter 57 of radiation beam 53 to form a "wide" radiation beam 53' having an increased beam diameter 57'. Conversely, the gain and/or phase of at least some of the antenna elements 62 of antenna 60 may be altered to decrease the diameter 57 of radiation beam 53 along its longitudinal length to form a "skinny" radiation beam 53" having a reduced beam diameter 57". By manipulating the width of the radiation beam 53 using beamforming control module 73, radiation beam 53 may be focused on particular RFID tags 20 that fall within the tuned radiation beam 53, which may in-turn yield information regarding the position of the RFID tags 20. For example, the diameter 57 of radiation beam 53 may be gradually increased and decreased (e.g., swept) such that different RFID tags 20 fall into and out of the radiation beam 53 (with the shape of radiation beam 53 at any given point in time being known by control unit 70 and/or host computer system 30) indicating their positions relative to the position of antenna 60.

Figure 4:
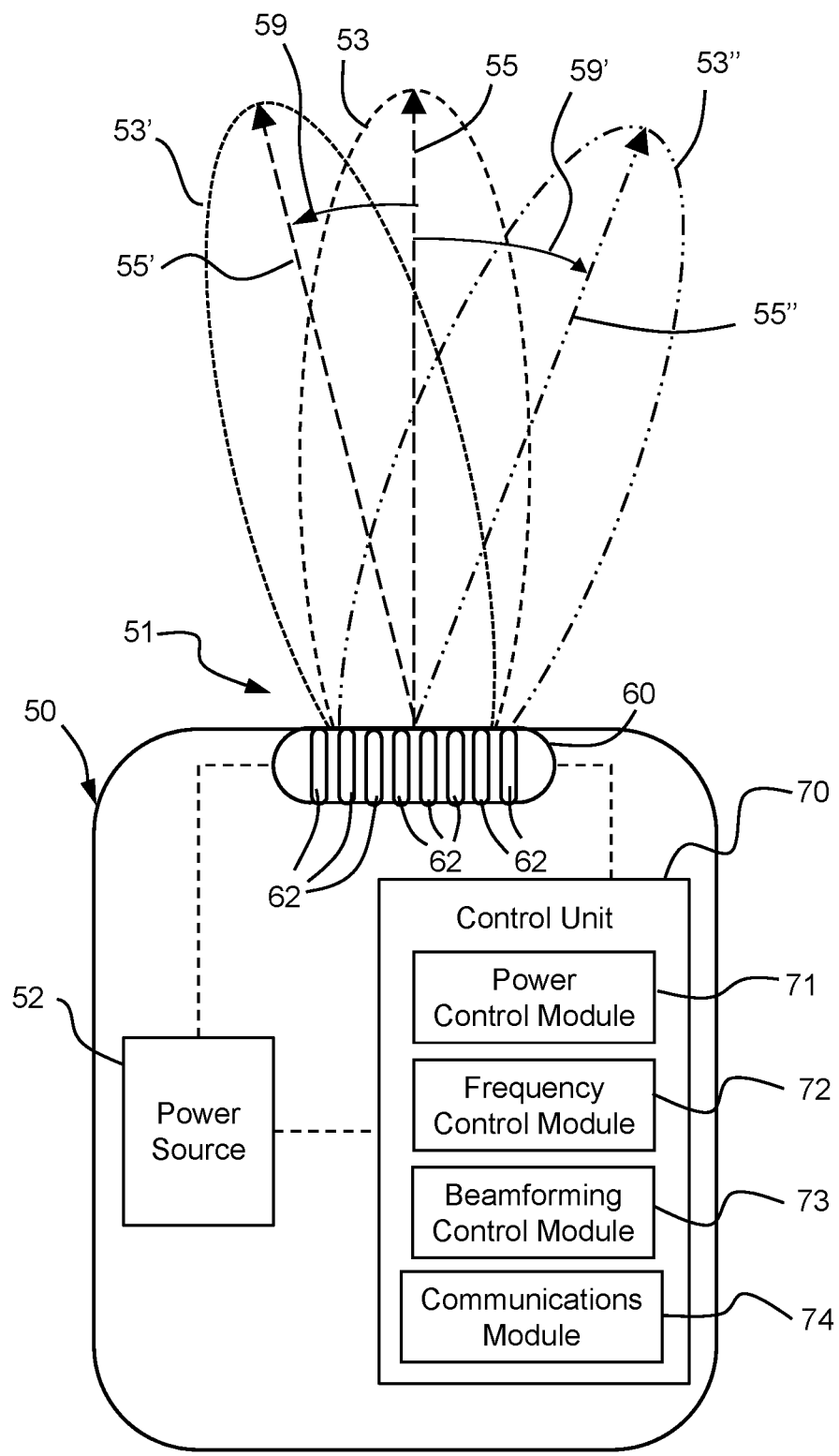

Referring to FIG. 4, in addition to adjusting the diameter 57 of radiation beam 53, beamforming control module 73 is also configured to facilitate the selective steering of radiation beam 53. For example, radiation beam 53 may be steered in a first direction relative to a steering axis (e.g., an axis extending out of the page in FIG. 4 and oriented orthogonal to beam axis 55) to produce a first tilted or steered radiation beam 53' having a beam axis 55' oriented at a first non-zero angle 59 to the beam axis 55 of original radiation beam 53. In addition, radiation beam 53 may be steered in a second direction (opposite the first direction) relative to the steering axis to produce a second tilted or steered radiation beam 53" having a beam axis 55" oriented at a second non-zero angle 59' to the beam axis 55 of original radiation beam 53. While FIG. 4 illustrates steering about a single steering axis, it may be understood that in at least some embodiments the beamforming control module 73, via independently adjusting the gain and/or phase of antenna elements 62 of antenna 60, may steer the radiation beam 53 produced by antenna 60 relative to a plurality of steering axes extending orthogonal to the beam axis 55. For instance, in an example where beam axis 55 extends along the Z-axis of an X, Y, Z coordinate space, beamforming control module 73 may steer the radiation beam 53 independently relative to a pair of steering axes extending along the X- and Y-axes, respectively.

Figure 5:
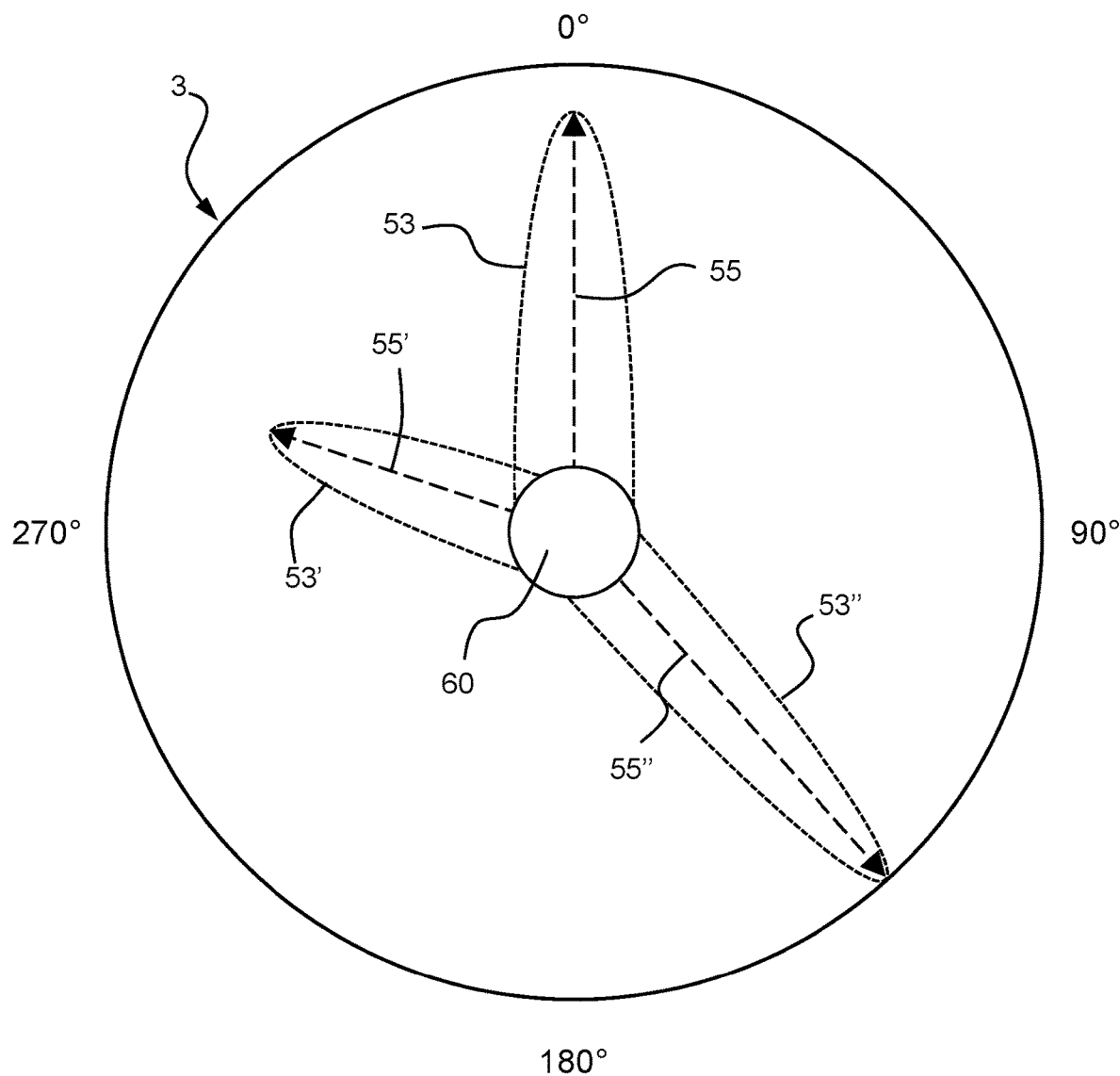
FIG. 5 is an illustration of an azimuth surrounding a RFID reader according to an embodiment of the disclosure.

Referring to FIG. 5, a projected azimuth 3 surrounding the antenna 60 (shown in an end view in FIG. 5) of RFID reader 50 is shown for illustrating additional ways in which radiation beam 53 may be tuned by the control unit 70. Particularly, an original or first radiation beam 53 is shown generated by antenna 60 as controlled by the control unit 70. First radiation beam 53 has a first amplitude (e.g., associated with an emission power level of the first radiation beam 53) and a first direction extending at 0° along azimuth 3 in this example. By combining control modules 71 and 73, different parameters of first radiation beam 53 may be adjusted or tuned simultaneously. For example, a second radiation beam 53' is shown in FIG. 5 having a different (lesser) amplitude (e.g., associated with an emission power of the second radiation beam 53') than first radiation beam 53 and extending in a different direction (approximately 280° along azimuth 3 in this example) along the azimuth 3 than the first direction of first radiation beam 53. In addition, a third radiation beam 53" is shown in FIG. 5 having a different (greater) amplitude (e.g., associated with an emission power of the third radiation beam 53") than first radiation beam 53 and second radiation beam 53' and extending in a third direction (approximately 140° along azimuth 3 in this example) along the azimuth 3 that is different from both the first direction of first radiation beam 53 and the second direction of second radiation beam 53'.

Further, in some embodiments, the frequency control module 72 of control unit 70 may be operated simultaneously with the control modules 71 and 73 of control unit 70 to simultaneously vary other parameters of the radiation beam 53. For example, the first radiation beam 53 may correspond to a first emission frequency band while second radiation beam 53' may correspond to a second emission frequency band that does not overlap with the first emission frequency band. In addition, the third radiation beam 53" may correspond to a third emission frequency band that does not overlap with either the first emission frequency band of first radiation beam 53 or the second emission frequency band of second radiation beam 53". In this manner, first radiation beam 53 may only be read by RFID tags 20 operating within the first emission frequency band, second radiation beam 53' may only be read by RFID tags 20 operating within the second emission frequency band, and third radiation beam 53" may only be read by RFID tags 20 operating within the third emission frequency band.

Returning to FIG. 1, the communication module 74 facilities communication between RFID reader 50 and host computer system 30. In some embodiments, communication module 74 comprises a wireless communication module (e.g., for facilitating wireless communication) while in other embodiments communication module 74 may represent a wired connection. In this manner, signals and/or data may be communicated between host computer system 30 and RFID reader 50. For instance, instructions to be implemented by the control unit 70 of RFID reader 50 may be communicated from host computer system 30 to the RFID reader 50. Additionally, information collected from one or more RFID tags 20 detected or read by the RFID reader 50 may be communicated from the RFID reader 50 to the host computer system 30.

As described above, instructions stored on host computer system 30 may include one or more predefined scanning routines performable by the RFID reader 50 in response to the execution of such instructions by host computer system 30. Each scanning routine may comprise a series of instructions (e.g., temporally sequenced instructions) that may be implemented by RFID reader 50 at the behest of host computer system 30. Particularly, and referring now to FIGS. 1 and 6, such scanning routines may include a 360° perimeter scan (indicated generally by arrow 80) illustrated schematically in FIG. 6. Perimeter scan 80 may be utilized in a variety of applications, such as for tracking inventory in a warehouse, and tracking merchandise in a retail store setting.

In this exemplary embodiment, perimeter scan 80 may be initiated by the RFID reader 50 (e.g., as controlled or operated by the host computer system 30) whereby antenna 60, using beamforming control module 73 of control unit 70, produces a plurality of radiation beams 53 extending from antenna 60 and which are circumferentially spaced about the antenna axis 65 of antenna 60. In some embodiments, the plurality of radiation beams 53 comprise a continuous radiation beam 53 that is steered or swept by the beamforming control unit 73 360° around the antenna axis 65 of the antenna 60. In other embodiments, the plurality of radiation beams 53 comprise separate and distinct radiation beams 53 which may be formed consecutively with the formation of a second radiation beam 53 following the extinguishment of a first radiation beam 53 that is angularly spaced from the second radiation beam 53.

In this exemplary embodiment, perimeter scan 80 may include, in addition, modulating by the power control module 71 of control unit 70 the emission power of antenna 60 such that emission power levels of the plurality of circumferentially spaced radiation beams 53 vary in magnitude (e.g., in longitudinal magnitude along their respective beam axes 55). In this manner, the effective longitudinal lengths of the radiation beams 53 may be increased and/or decreased as the plurality of circumferentially spaced radiation beams 53 are formed about the antenna axis 65 of antenna 60.

Perimeter scan 80 may be conducted to detect one or more RFID tags 20 positioned in the proximity of RFID reader 50 and at different circumferential locations and radial (e.g., extending orthogonal antenna axis 65) distances from the RFID reader 50. In some embodiments, perimeter scan 80 may be conducted such that an elliptical area surrounding the antenna 60 corresponding to a maximum emission range or area of the antenna 60 (e.g., the area encompassed by azimuth 3 in FIG. 6) is swept by the radiation beam 53. In this manner, each RFID tag 20 located within the maximum emission area of antenna 60 may be detected by the RFID reader 50. Particularly, information may be captured or read from each of the RFID tags 20 located within the maximum emission area of antenna 60 by RFID reader 50.

In some embodiments, in addition to detecting RFID tags 20 present within the maximum emission area of antenna 60, RFID reader 50 (or more specifically the host computer system 30 controlling RFID reader 50) may determine or estimate the locations in physical space of RFID tags 20. Particularly, the host computer system 30 may track or monitor over time a current configuration of the radiation beam 53 emitted from the antenna 60 of RFID reader 50, where the configuration of radiation beam 53 includes the emission power level of the radiation beam 53, the emission frequency band of the radiation beam 53, the direction of the radiation beam 53 (e.g., the vector in physical space of the beam axis 55 of radiation beam 53), and the size or shape of the radiation beam 53.

By tracking the configuration of radiation beam 53 over time, the detection at a given point in time of a respective RFID tag 20 may be correlated by the host computer system 30 with the configuration of radiation beam 53 at the time at which the RFID tag 20 was detected. In other words, at the time of detection, the configuration of radiation beam 53 is known or estimated by host computer system 30. By both tracking the configuration of radiation beam 53 over time and conducting the perimeter scan 80 in a predefined or programmatic pattern, the location of a detected RFID tag 20 may be determined or inferred by host computer system 30.

As an example, in some embodiments when conducting the perimeter scan 80, for each of a plurality of radial directions along the azimuth 3, the radiation beam 53 may begin at a minimum emission power level followed by the gradual increase of the emission power level of the radiation beam 53 until the maximum emission power of antenna 60 has been achieved. In this manner, for each given angular direction, the radiation beam 53 may increase from a minimum longitudinal length to a maximum longitudinal length. As the emission power level of the radiation beam 53 (located at the given radial direction) is increased, the RFID reader 50 may detect one of the RFID tags 20. Upon detecting the RFID tag 20, host computer system 30 may infer that the detected RFID tag 20 is at a similar angular direction as the radiation beam 53 (depending on the shape of the radiation beam 53) and is located at a radial distance from the RFID reader 50 corresponding or correlated with the emission power level of radiation beam 53 at the time of detection. Thus, in this manner, host computer system 30 may determine both a radial direction and a radial distance from the RFID reader 50 in physical space. This process may be repeated for each of a plurality of circumferentially spaced radial directions (including each radial direction extending entirely around azimuth 3 in which the radiation beam 53 comprises a continuous beam 53 that is swept entirely around the axis 65 of antenna 60) to determine the locations in physical space of each of the RFID tags 20 relative to RFID reader 50 within the maximum emission range of antenna 60.

In some embodiments, host computer system 30, in addition to operating the power control module 71 and beamforming control module 73 of control unit 70, may also operate (e.g., concurrently or sequentially with the operation of modules 71 and 73) the frequency control module 72 to modulate the emission frequency band of the radiation beams 53 emitted by RFID reader 50 during the performance of the perimeter scan 80.

As an example, a first emission frequency band may be selected by host computer system 30 that corresponds to a desired first subset of the RFID tags 20 within the maximum emission range of antenna 60. The first subset of RFID tags 20 may only respond when contacted by a radiation beam 53 at the first emission frequency band, and may not respond to radiation beams 53 contacting the first subset of RFID tags 20 at emission frequency bands other than the first emission frequency band. In addition, the first subset of RFID tags 20 may correspond to a particular class of objects (e.g., a particular class of inventory or merchandise to which the first subset of RFID tags 20 are coupled or attached) of interest to the host computer system 30.

In some embodiments, a first perimeter scan 80 may be conducted at a first emission frequency band targeting a first subset of the RFID tags 20, followed by the performance of a second perimeter scan 80 at a second emission frequency band (different from the first emission frequency band) targeting a second subset of the RFID tags 20 (separate from the first subset of RFID tags 20), and so on and so forth until each distinct subset of RFID tags 20 within the maximum emission area of antenna 60 has been detected and read by RFID reader 50. Thus, host computer system 30 through operating RFID reader 50 may determine the locations in physical space of each of the RFID tags 20 along with determining each of their given classifications (e.g., whether a given detected RFID tag 20 belongs to a first class or subset, a second class or subset, and so on and so forth). Alternatively, in certain embodiments, a single perimeter scan 80 may be conducted in which the emission frequency band of the radiation beams 53 formed during the performance of the perimeter scan 80 is adjusted.

Figure 6:
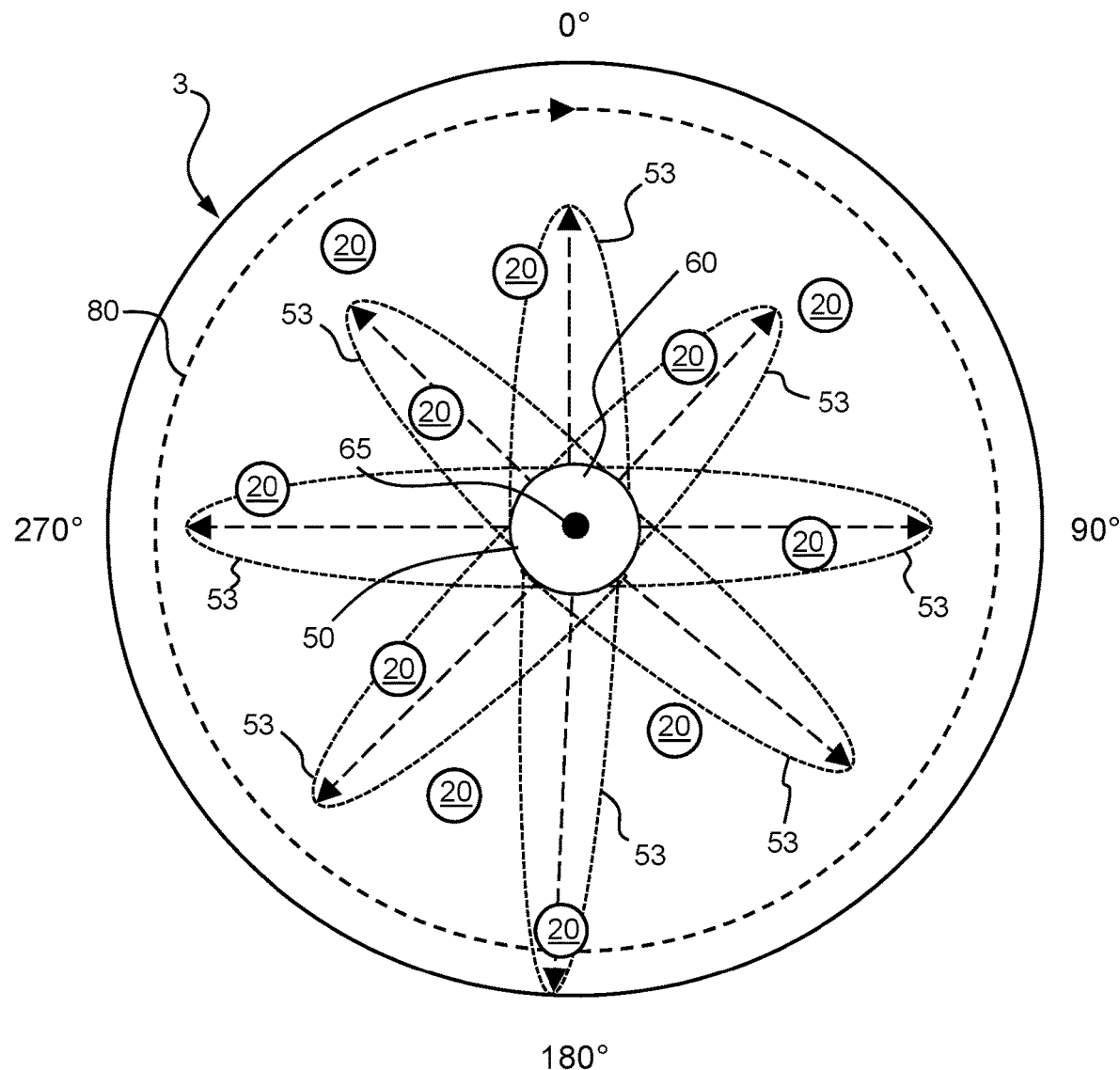
FIG. 6 is an illustration of a 360° perimeter scan executable by a RFID system according to an embodiment of the disclosure.

In addition to performing the perimeter scan 80 shown in FIG. 6, host computer system may include instructions for performing additional routines or scans. For example, and referring now to FIGS. 7-9, a row scan 90 performable by the RFID system 10 is shown. Row scan 90 may be conducted by the host computer system 30 using the RFID reader 50, where the row scan 90 may be encoded as instructions stored on the host computer system 30. In this exemplary embodiment, RFID tags 20 are arranged in a plurality of rows including a first row 91 and a second row 92 that is spaced from the first row 91. In some embodiments, RFID tags 20 may each be coupled to different merchandise also arranged in rows 91 and 92. Additionally, while rows 91 and 92 are shown as rectilinear in FIGS. 7-9, it may be understood that rows 91 and/or 92 may comprise shapes or arrangements other than rectilinear.

As with the perimeter scan 80 shown in FIG. 6, in performing the row scan 90, host computer system 30 may, along with detecting and reading the RFID tags 20 arranged in rows 91 and 92, determine their respective locations in physical space relative to the RFID reader 50. In addition, in conducting row scan 90, host computer system 30 may determine, based on the emission frequency band to which the RFID tags 20 respond, a given class of each of the RFID tags 20 (e.g., corresponding to different classes of merchandise or inventory to which the RFID tags 20 are attached).

In some embodiments, row scan 90 may be conducted by producing a radiation beam 53 extending from the antenna 60 of RFID reader 50 and defined by an outer cutoff, and modulating (e.g., using the power control module 71 and/or beamforming control module 73 of control unit 70), the configuration of the radiation beam 53 whereby the cutoff of the radiation beam 53 travels towards one or more of the RFID tags 20 positioned along the first row 91. As the cutoff of radiation beam 53 travels towards one or more of the RFID tags 20 arranged along the first row 91, the RFID reader 50 may detect one or more RFID tags 20 arranged along the first row 91 (e.g., via the generation of response signals 21 from the detected RFID tags 20). The row scan 90 may continue until each of the RFID tags 20 positioned along rows 91 and 92 have been programmatically detected and read.

Figure 7:
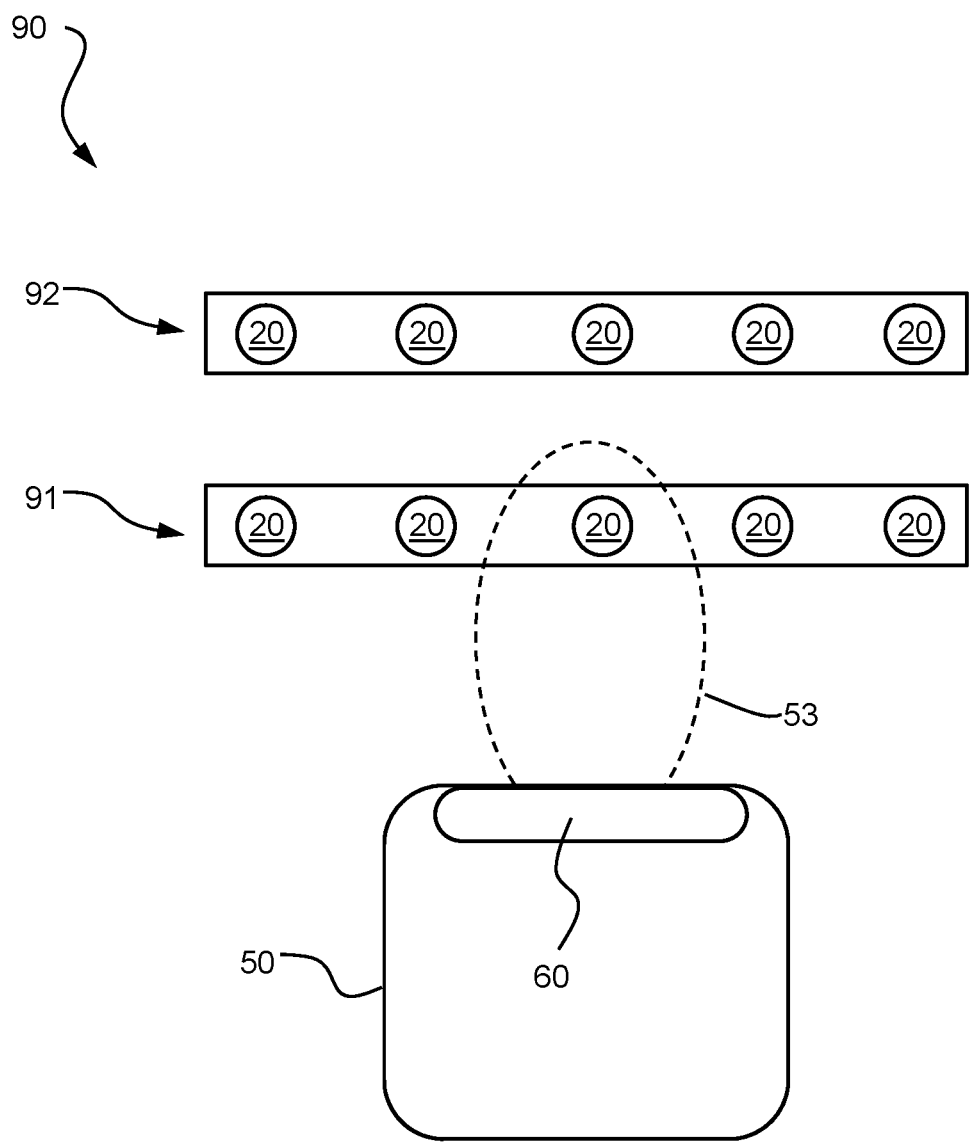
FIGS. 7-9 are illustrations of a row scan executable by a RFID system according to an embodiment of the disclosure.
Figure 8:
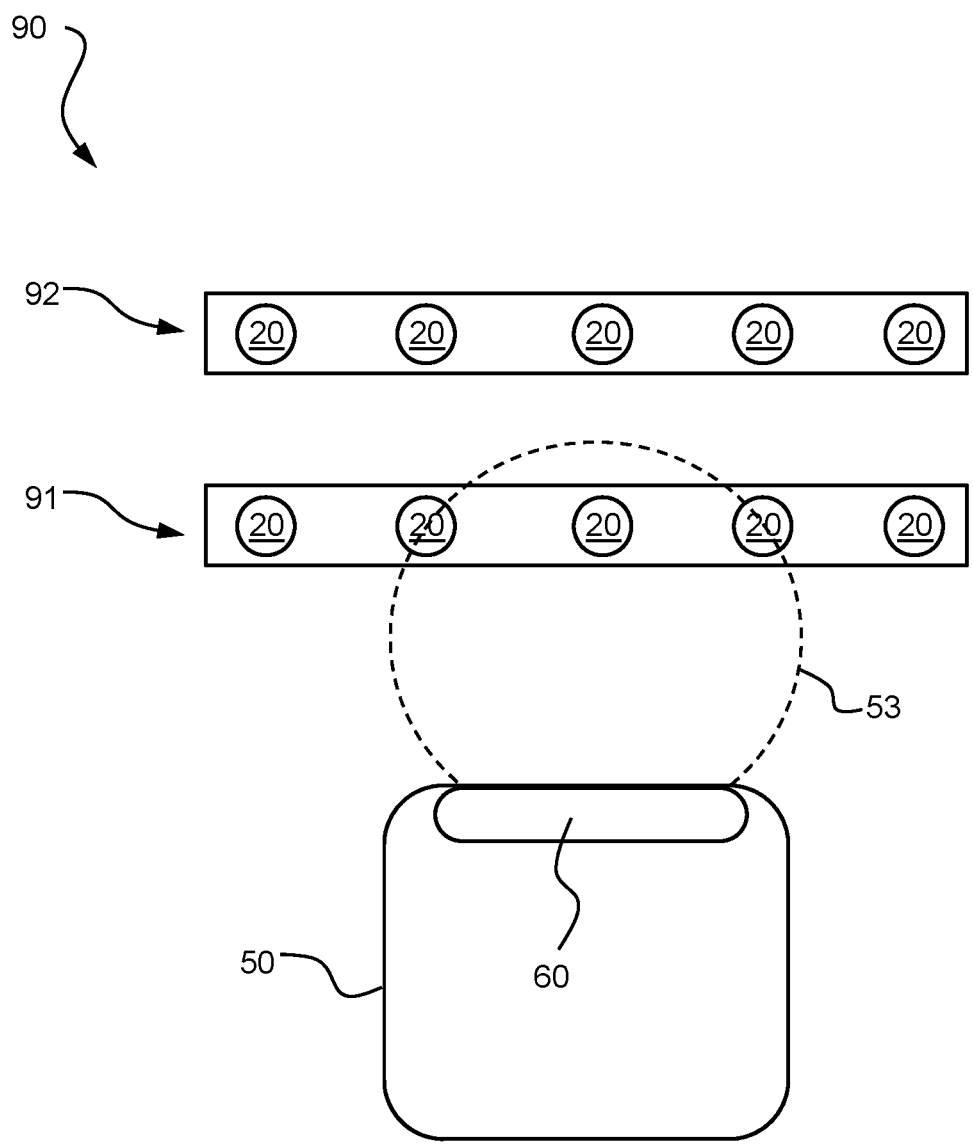

As an example, FIG. 7 illustrates an initial segment of the row scan 90 in which radiation beam 53 only contacts one of the RFID tags 20 (causing the detected RFID tag 20 to transmit a response signal 21 to the RFID reader 50) arranged along the first row 91. FIG. 8 illustrates a segment of the row scan 90 following the initial segment shown in FIG. 7. Particularly, in FIG. 8 the configuration of radiation beam 53 has been altered (e.g., through the operation by host computer system 30 of control modules 71 and 73) such that radiation beam 53 contacts a plurality of RFID tags 20 positioned along the first row 91 whereby RFID reader 50 receives response signals 21 from each of the plurality of detected RFID tags 20.

Figure 9:
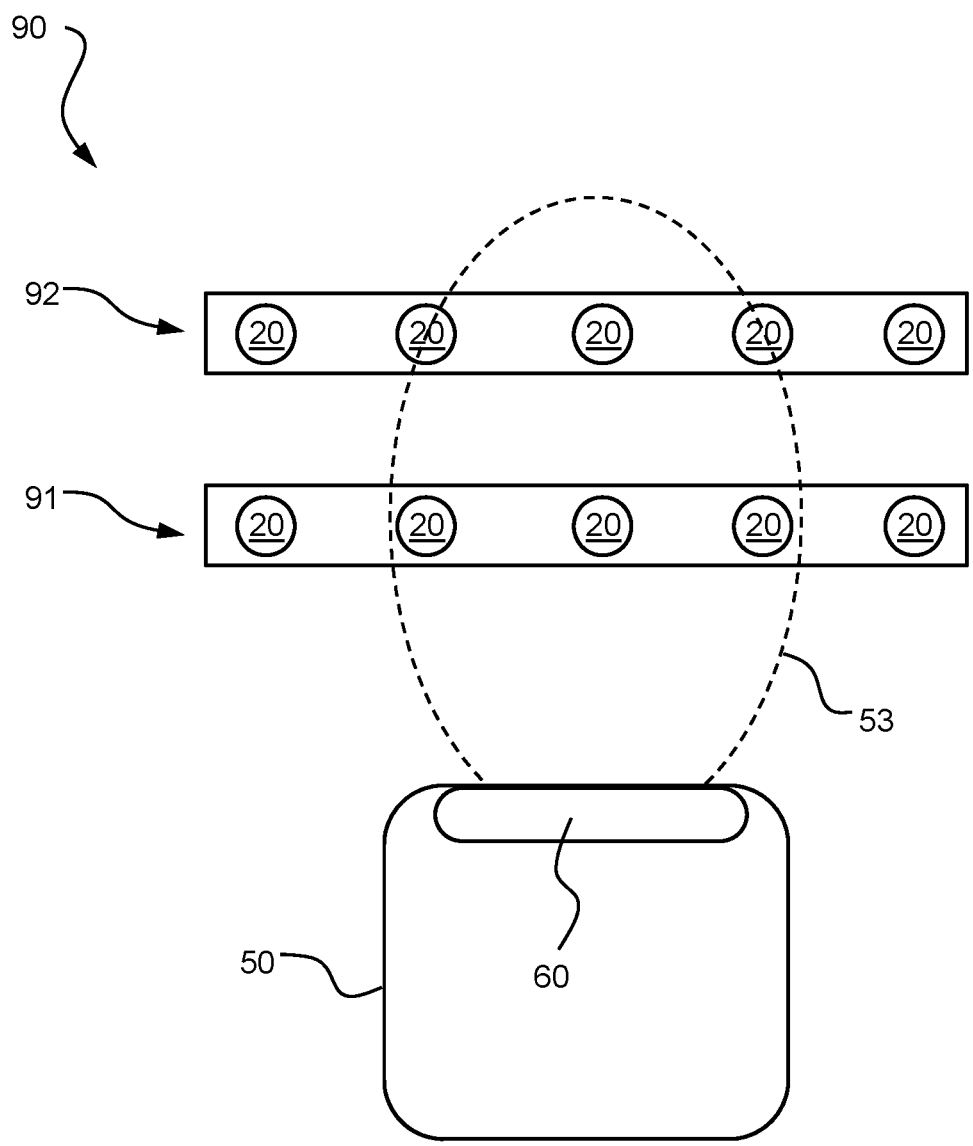

Further, FIG. 9 illustrates an additional segment of the row scan 90 following the segment shown in FIG. 7. Particularly, in FIG. 9, the configuration of radiation beam 53 has again been altered such that radiation beam 53 now penetrates into the second row 92 and is thus able to detect one or more RFID tags 20 positioned along the second row 92. This process may be continued until each of the RFID tags 20 positioned along rows 91 and 92 has been successfully detected and read by the RFID reader 50. In addition, the configuration of radiation beam 53 may be tracked over time by host computer system 30 to permit system 30 to determine the location in physical space of RFID tags 20 as the continuing alteration of the configuration of radiation beam 53 triggers detection of the RFID tags 20.

Figure 10:
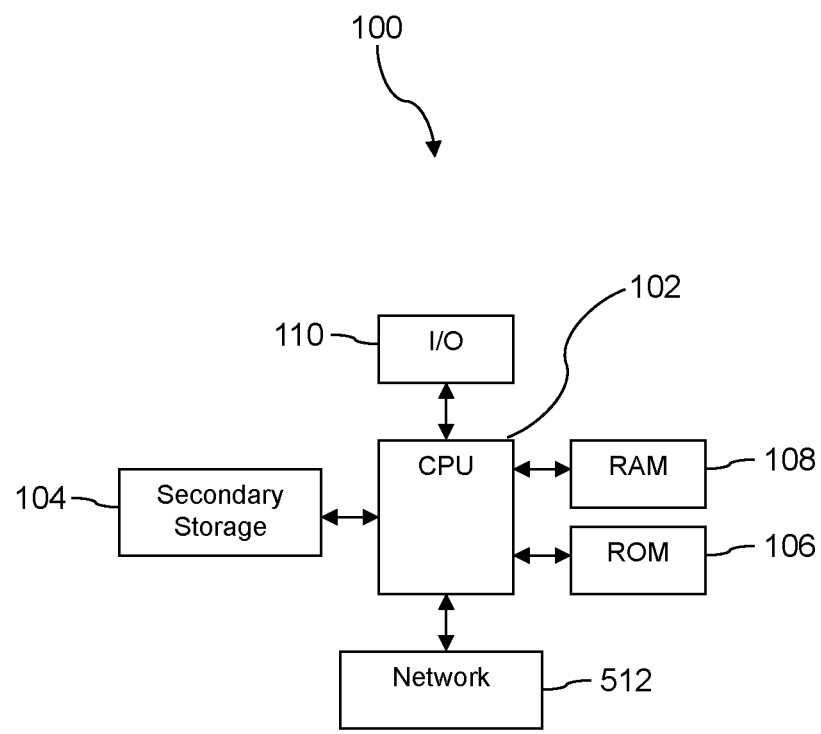
FIG. 10 is a block diagram of a computer system according to an embodiment of the disclosure.

FIG. 10 illustrates a computer system 100 suitable for implementing one or more embodiments disclosed herein. The computer system 100 includes a processor 102 (which may be referred to as a central processor unit or CPU) that is in communication with memory devices including secondary storage 104, read only memory (ROM) 106, random access memory (RAM) 108, input/output (I/O) devices 510, and network connectivity devices 112. The processor 102 may be implemented as one or more CPU chips.

It is understood that by programming and/or loading executable instructions onto the computer system 100, at least one of the CPU 102, the RAM 108, and the ROM 106 are changed, transforming the computer system 100 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 100 is turned on or booted, the CPU 102 may execute a computer program or application. For example, the CPU 102 may execute software or firmware stored in the ROM 106 or stored in the RAM 108. In some cases, on boot and/or when the application is initiated, the CPU 102 may copy the application or portions of the application from the secondary storage 104 to the RAM 108 or to memory space within the CPU 102 itself, and the CPU 102 may then execute instructions that the application is comprised of. In some cases, the CPU 102 may copy the application or portions of the application from memory accessed via the network connectivity devices 112 or via the I/O devices 510 to the RAM 108 or to memory space within the CPU 102, and the CPU 102 may then execute instructions that the application is comprised of. During execution, an application may load instructions into the CPU 102, for example load some of the instructions of the application into a cache of the CPU 102. In some contexts, an application that is executed may be said to configure the CPU 102 to do something, e.g., to configure the CPU 102 to perform the function or functions promoted by the subject application. When the CPU 102 is configured in this way by the application, the CPU 102 becomes a specific purpose computer or a specific purpose machine.

The secondary storage 104 is typically comprised of one or more disk drives or tape drives and is used for non-volatile storage of data and as an over-flow data storage device if RAM 108 is not large enough to hold all working data. Secondary storage 104 may be used to store programs which are loaded into RAM 108 when such programs are selected for execution. The ROM 106 is used to store instructions and perhaps data which are read during program execution. ROM 106 is a non-volatile memory device which typically has a small memory capacity relative to the larger memory capacity of secondary storage 104. The RAM 108 is used to store volatile data and perhaps to store instructions. Access to both ROM 106 and RAM 108 is typically faster than to secondary storage 104. The secondary storage 104, the RAM 108, and/or the ROM 106 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 112 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 112 may provide wired communication links and/or wireless communication links (e.g., a first network connectivity device 112 may provide a wired communication link and a second network connectivity device 112 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 112 may enable the processor 102 to communicate with the Internet or one or more intranets. With such a network connection, it is contemplated that the processor 102 might receive information from the network, or might output information to the network in the course of performing the above-described method steps. Such information, which is often represented as a sequence of instructions to be executed using processor 102, may be received from and outputted to the network, for example, in the form of a computer data signal embodied in a carrier wave.

Such information, which may include data or instructions to be executed using processor 102 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 102 executes instructions, codes, computer programs, scripts which it accesses from hard disk, floppy disk, optical disk (these various disk-based systems may all be considered secondary storage 104), flash drive, ROM 106, RAM 108, or the network connectivity devices 112. While only one processor 102 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 104, for example, hard drives, floppy disks, optical disks, and/or other device, the ROM 106, and/or the RAM 108 may be referred to in some contexts as non-transitory instructions and/or non-transitory information.

In an embodiment, the computer system 100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 100 to provide the functionality of a number of servers that is not directly bound to the number of computers in the computer system 100. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 100, at least portions of the contents of the computer program product to the secondary storage 104, to the ROM 106, to the RAM 108, and/or to other non-volatile memory and volatile memory of the computer system 100. The processor 102 may process the executable instructions and/or data structures in part by directly accessing the computer program product, for example by reading from a CD-ROM disk inserted into a disk drive peripheral of the computer system 100. Alternatively, the processor 102 may process the executable instructions and/or data structures by remotely accessing the computer program product, for example by downloading the executable instructions and/or data structures from a remote server through the network connectivity devices 112. The computer program product may comprise instructions that promote the loading and/or copying of data, data structures, files, and/or executable instructions to the secondary storage 104, to the ROM 106, to the RAM 108, and/or to other non-volatile memory and volatile memory of the computer system 100.

In some contexts, the secondary storage 104, the ROM 106, and the RAM 108 may be referred to as a non-transitory computer readable medium or a computer readable storage media. A dynamic RAM embodiment of the RAM 108, likewise, may be referred to as a non-transitory computer readable medium in that while the dynamic RAM receives electrical power and is operated in accordance with its design, for example during a period of time during which the computer system 100 is turned on and operational, the dynamic RAM stores information that is written to it. Similarly, the processor 102 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A radio-frequency identification (RFID) system, the system comprising:
   a RFID reader comprising a reader control unit and a reader antenna, wherein the reader antenna comprises a plurality of separate antenna elements; and
   a computer system communicatively coupled to the control unit of the RFID reader, wherein the computer system comprises:
   a processor;
   a non-transitory computer readable medium; and
   one or more applications stored in the non-transitory computer readable medium that, when executed by the processor:
   initiate by the RFID reader a 360° perimeter scan whereby the reader antenna, using a beamforming control module of the reader control unit, produces a plurality of radiation beams extending from the reader antenna and circumferentially spaced about an axis of the reader antenna;
   modulate by a frequency control module of the reader control unit an emission frequency of the reader antenna during the performance of the 360° perimeter scan such that emission frequency bands of the plurality of radiation beams vary from one another;
   detect by the RFID reader one or more first RFID tags of a plurality of RFID tags in response to producing one or more radiation beams of the plurality of radiation beams at a first emission frequency band that corresponds to an emission frequency band of the one or more first RFID tags; and
   detect by the RFID reader one or more second RFID tags, different from the one or more first RFID tags, of the plurality of RFID tags in response to producing one or more radiation beams of the plurality of radiation beams at a second emission frequency band that is different from the first emission frequency band and which corresponds to an emission frequency band of the one or more second RFID tags.

2. The RFID system of claim 1, wherein the plurality of radiation beams comprise a continuous radiation beam that is steered by the beamforming control unit 360° around the axis of the reader antenna.

3. The RFID system of claim 2, wherein the one or more applications, when executed by the processor:
   modulate by the power control module of the reader control unit the emission power of the reader antenna as the continuous radiation beam is steered by the beamforming control unit.

4. The RFID system of claim 1, wherein the one or more first RFID tags are each associated with a first class of merchandise while the one or more second RFID tags are each associated with a second class of merchandise that is different from the first class.

5. The RFID system of claim 1, wherein the one or more applications, when executed by the processor:
   determine locations in physical space of the one or more RFID tags based on the configurations of the plurality of radiation beams, as determined by the host computer system, at the times the one or more RFID tags are detected by the RFID reader.

6. The RFID system of claim 1, wherein the one or more applications, when executed by the processor:
   modulate by a power control module of the reader control unit an emission power of the reader antenna during the performance of the row scan such that an emission power level of the radiation beam varies in magnitude.

7. A radio-frequency identification (RFID) system, the system comprising:
   a plurality of separate RFID tags arranged in a plurality of separate rows;
   a RFID reader comprising a reader control unit and a reader antenna, wherein the reader antenna comprises a plurality of separate antenna elements; and
   a computer system communicatively coupled to the control unit of the RFID reader, wherein the computer system comprises:
   a processor;
   a non-transitory computer readable medium; and
   one or more applications stored in the non-transitory computer readable medium that, when executed by the processor:
   initiate by the RFID reader a row scan whereby the reader antenna produces a radiation beam extending from the reader antenna and defined by an outer cutoff; modulate, using a beamforming control module of the reader control unit, a configuration of the radiation beam whereby the cutoff of the radiation beam travels towards one or more RFID tags positioned along a first row of the plurality of rows of RFID tags;
   modulate by a power control module of the reader control unit an emission power of the reader antenna during the performance of the row scan such that an emission power level of the radiation beam varies in magnitude; and
   detect by the RFID reader one or more of the RFID tags positioned along the first row as the cutoff of the radiation beam travels towards the one or more RFID tags positioned along the first row and as the configuration of the radiation beam is modulated by the power control module.

8. The RFID system of claim 7, wherein the cutoff of the radiation beam defines a diameter of the radiation beam.

9. The RFID system of claim 8, wherein the one or more applications, when executed by the processor:
   adjust, by the beamforming control module of the reader control unit, the diameter of the radiation beam whereby the cutoff of the radiation beam travels towards one or more RFID tags positioned along a first row of the plurality of rows of RFID tags.

10. The RFID system of claim 7, wherein the one or more applications, when executed by the processor:
    steer by the beamforming control module of the reader control unit a beam axis of the radiation beam whereby the cutoff of the radiation beam travels towards one or more RFID tags positioned along a first row of the plurality of rows of RFID tags.

11. The RFID system of claim 7, wherein the one or more applications, when executed by the processor:
increase by the power control module of the reader control unit the emission power of the reader antenna during the performance of the row scan such that the emission power level of the radiation beam increases in magnitude with the cutoff of the radiation beam travelling towards one or more RFID tags positioned along a second row, spaced from the first row, of the plurality of rows of RFID tags.

12. The RFID system of claim 11, wherein the one or more applications, when executed by the processor:
detect by the RFID reader one or more of the RFID tags positioned along the second row as the cutoff of the radiation beam travels towards the one or more RFID tags positioned along the second row and as the emission power level of the radiation beam is increased by the power control module.

13. The RFID system of claim 7, wherein the one or more applications, when executed by the processor:
determine locations in physical space of the one or more RFID tags located along the first row based on the configuration of the radiation beam, as determined by the host computer system, at the times the one or more RFID tags located along the first row are detected by the RFID reader.

14. A radio-frequency identification (RFID) system, the system comprising:
a RFID reader comprising a reader control unit and a reader antenna, wherein the reader antenna comprises a plurality of separate antenna elements; and
a computer system communicatively coupled to the control unit of the RFID reader, wherein the computer system comprises:
a processor;
a non-transitory computer readable medium; and
one or more applications stored in the non-transitory computer readable medium that, when executed by the processor:
initiate by the RFID reader a 360° perimeter scan whereby the reader antenna, using a beamforming control module of the reader control unit, produces a plurality of radiation beams extending from the reader antenna and circumferentially spaced about an axis of the reader antenna;
modulate by a power control module of the reader control unit an emission power of the reader antenna during the performance of the 360° perimeter scan such that emission power levels of the plurality of radiation beams vary in magnitude; and
detect by the RFID reader one or more RFID tags of a plurality of separate RFID tags in response to the performance of the perimeter scan.

15. The RFID system of claim 14, wherein the one or more applications, when executed by the processor:
receive a response signal encoding data from one or more tag antennas of the one or more RFID tags in response to the performance of the perimeter scan.

16. The RFID system of claim 14, wherein the plurality of radiation beams comprise a continuous radiation beam that is steered by the beamforming control unit 360° around the axis of the reader antenna.

17. The RFID system of claim 16, wherein the one or more applications, when executed by the processor:
modulate by the power control module of the reader control unit the emission power of the reader antenna as the continuous radiation beam is steered by the beamforming control unit.

18. The RFID system of claim 14, wherein the one or more applications, when executed by the processor:
determine locations in physical space of the one or more RFID tags based on the configurations of the plurality of radiation beams, as determined by the host computer system, at the times the one or more RFID tags are detected by the RFID reader.

19. The RFID system of claim 18, wherein the configurations of the plurality of radiation beams each comprises the emission power level of the one or more radiation beams and a direction of a beam axis of the one or more radiation beams at the times the one or more RFID tags are detected by the RFID reader.

20. The RFID system of claim 14, wherein the one or more applications, when executed by the processor:
modulate by a frequency control module of the reader control unit an emission frequency of the reader antenna during the performance of the perimeter scan such that emission frequency bands of the plurality of radiation beams vary from one another;
detecting by the RFID reader one or more first RFID tags of a plurality of RFID tags in response to producing one or more radiation beams of the plurality of radiation beams at a first emission frequency band that corresponds to an emission frequency band of the one or more first RFID tags; and
detecting by the RFID reader one or more second RFID tags, different from the one or more first RFID tags, of the plurality of RFID tags in response to producing one or more radiation beams of the plurality of radiation beams at a second emission frequency band that is different from the first emission frequency band and which corresponds to an emission frequency band of the one or more second RFID tags.

* * * * *